(12) United States Patent
Sato et al.

(10) Patent No.: US 9,115,268 B2
(45) Date of Patent: Aug. 25, 2015

(54) CURABLE SILICONE RUBBER COMPOSITION AND MEASUREMENT METHOD FOR CURABLE SILICONE RUBBER COMPOSITIONS

(75) Inventors: Kenta Sato, Tokyo (JP); Kazunobu Senoo, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 12 days.

(21) Appl. No.: 14/007,628

(22) PCT Filed: Mar. 29, 2012

(86) PCT No.: PCT/JP2012/058369
§ 371 (c)(1),
(2), (4) Date: Sep. 25, 2013

(87) PCT Pub. No.: WO2012/133656
PCT Pub. Date: Oct. 4, 2012

(65) Prior Publication Data
US 2014/0045987 A1    Feb. 13, 2014

(30) Foreign Application Priority Data

Mar. 31, 2011  (JP) .................................. 2011-077157
Sep. 30, 2011  (JP) .................................. 2011-215787

(51) Int. Cl.
*C08K 3/36* (2006.01)
*C08L 83/04* (2006.01)

(52) U.S. Cl.
CPC .. *C08K 3/36* (2013.01); *C08L 83/04* (2013.01)

(58) Field of Classification Search
CPC ........................................................ C08K 3/36
See application file for complete search history.

(56) References Cited

U.S. PATENT DOCUMENTS

| 3,671,480 A | 6/1972 | Wada et al. |
| 3,884,866 A | 5/1975 | Jeram et al. |
| 4,061,609 A | 12/1977 | Bobear |
| 4,539,357 A | 9/1985 | Bobear |
| 2007/0166555 A1* | 7/2007 | Ikeno et al. ................. 428/447 |
| 2007/0191537 A1* | 8/2007 | Meyer et al. ................ 524/588 |
| 2011/0166288 A1* | 7/2011 | Woerner .................... 524/547 |

FOREIGN PATENT DOCUMENTS

| CN | 1930224 A | 3/2007 |
| JP | 47-018419 A | 5/1972 |
| JP | 04-117457 A | 4/1992 |
| JP | 06-088027 A | 3/1994 |
| JP | 07-228782 A | 8/1995 |
| JP | 07-258551 A | 10/1995 |
| JP | 07-331079 A | 12/1995 |
| JP | 08-323857 A | 12/1996 |
| JP | 11-081053 A | 3/1999 |
| JP | 2002-080721 A | 3/2002 |

OTHER PUBLICATIONS

International Search Report dated Jul. 3, 2012, issued in corresponding application No. PCT/JP2012/058369.
Man Baoxin, "Study on improvement of tearing and felting strength of the silicon rubber", Journal of Rocket Propulsion, vol. 31, No. 5, pp. 43-46, Oct. 2005, Shaanxi Power Machine Design and Research Institute Xi' an 710100, China, cited in Chinese Office Action dated Feb. 17, 2015 with English partial translation (12 pages).
Chinese Office Action dated Feb. 17, 2015, issued in corresponding CN Patent Application No. 201280026197.5 with English translation (12 pages).

* cited by examiner

*Primary Examiner* — Robert S Loewe
(74) *Attorney, Agent, or Firm* — Westerman, Hattori, Daniels & Adrian, LLP

(57) ABSTRACT

The correlation between the aggregation structure of inorganic fillers such as silica microparticles in silicone rubbers and tensile strength and tear strength still has not been elucidated. The purpose of the invention is to provide a curable silicone rubber composition with which a silicone rubber of superior tensile strength and tear strength can be obtained. The invention provides a curable silicone rubber composition that is characterized in that the aggregate size of the inorganic filler prior to extending as determined by synchrotron X-ray diffraction measurement is 20-25 nm and the maximum value for the orientation coefficient of the curable silicone rubber composition when drawn as determined by synchrotron X-ray diffraction measurement is 0.25-0.35.

16 Claims, No Drawings

CURABLE SILICONE RUBBER COMPOSITION AND MEASUREMENT METHOD FOR CURABLE SILICONE RUBBER COMPOSITIONS

TECHNICAL FIELD

The present invention relates to curable silicone rubber composition which is subjected to structural analysis using a synchrotron X-ray diffraction measurement. Priority is claimed on Japanese Patent Application No. 2011-77157 filed Mar. 31, 2011 and on Japanese Patent Application No. 2011-215787 filed Sep. 30, 2011, the content of which is incorporated herein by reference.

BACKGROUND ART

Silicone rubber is used for various uses in a wide field, because of its excellent performance in heat-resistance, fire retardance, chemical stability, weatherability, radiation resistance, electrical characteristics, and so on. In particular, since silicone rubber is physiologically inactive and has little response to tissue when silicone rubber is touched with a living organism, silicone rubber has been utilized as a material for medical instruments such as various catheters for medical appliances.

A medical catheter is a tube which is inserted into a body cavity such as cavum thoracis or abdominal cavity, a lumen part such as alimentary canal or ureter, or a blood vessel, to be used for draining body fluid or injection infusion of drug solution, nutritional tonic, and contrast media. A medical catheter necessitates wound-resistance (tear-resistance), kink-resistance (tensile strength), transparency, and flexibility (stretching-extensibility), in addition to biocompatibility. As a use of medical catheter, specifically, for example, a drainage tube of an evacuator for draining and removing postoperative sanguis or pus, and a tube for postoperative nutrition such as percutaneous endoscopic gastrostomy (PEG) are exemplary examples. In addition, in order to produce silicone rubber in an extra-fine tube shape for catheter, silicone rubber composition as a silicone rubber material should have extrusion moldability.

As materials for a medical catheter, soft polyvinyl chloride has been generally used in addition to silicone rubber. Although silicone rubber is superior to polyvinyl chloride and so on, in biocompatibility and flexibility, it is required to improve the strength of silicone rubber such as tear strength or tensile strength, and in particular, tear strength.

If tear strength is not sufficient, then the catheter may be broken by scar caused by a needle or cutting tool during carrying out a surgical operation, or, if tensile strength is not sufficient, then the catheter may be bent to be yielded and kinked, and thereby distribution in the catheter of body fluid to be drained or drug solution to be infused may be stagnated.

Thus various methods have been proposed in order to improve the tear strength and the tensile strength of silicone rubber (for example, Patent Documents 1-7). As a specific method to provide high tear characteristics to silicone rubber, adding inorganic filler such as silica fine particles, or uneven distribution of crosslinking density (in the silicone rubber system, both the area of high-crosslinking density and the area of low-crosslinking are distributed) are specific methods. It is thought that the improvement of tear characteristics by uneven distribution of crosslinking density is because the area of high-crosslinking density serves as resistance against the tear internal force.

For example, Patent Document 1 discloses curable silicone rubber composition including high viscosity organopolysiloxane (raw rubber (A)) having a low vinyl group as a main component, low viscosity organopolysiloxane (silicone oil (B)) having a high vinyl group content, vinyl group containing organopolysiloxane copolymer (vinyl group containing silicone resin (C)), organohydrogensiloxane (cross-linking agent (D)), platinum or a platinum compound (hardening catalyst (E)) and fine-powdery silica (filler (F)).

In addition, there is an example which embodied a small-angle X-ray scattering measurement of acrylic fiber as an example which analyzed a polymer material by an X-ray radio scattering measurement (Patent Document 8); however, conformation analysis by an X-ray radio scattering measurement has not still conducted structural analysis of silicone rubber composition.

PRIOR ART DOCUMENTS

Patent Documents

Patent Document 1: Japanese Patent Laid-Open No. 7-331079
Patent Document 2: Japanese Patent Laid-Open No. 7-228782
Patent Document 3: Japanese Patent Laid-Open No. 7-258551
Patent Document 4: U.S. Pat. No. 3,884,866
Patent Document 5: U.S. Pat. No. 4,539,357
Patent Document 6: U.S. Pat. No. 4,061,609
Patent Document 7: U.S. Pat. No. 3,671,480
Patent Document 8: Japanese Patent Laid-Open No. 11-81053

DISCLOSURE OF INVENTION

Problem to be Solved by the Invention

However, it has not been clarified that what correlation is present between the aggregation construction of inorganic filler such as silica file particles in the silicone rubber and tensile strength or tear strength. It is an object of the present invention to provide a curable silicone resin composition, which is able to provide a silicone resin which excels in both tensile strength and tear strength.

Means to Solve the Problem

Such an object of the invention can be achieved by the present invention as claimed in the following (1)-(5):

(1) A curable silicone rubber composition characterized in that the aggregate size of the inorganic filler prior to extending as determined by synchrotron X-ray diffraction measurement ranges from 20 to 25 nm.

(2) The curable silicone rubber composition as set forth in (1), in which the maximum value for the orientation coefficient of the curable silicone rubber composition when drawn as determined by the synchrotron X-ray diffraction measurement ranges from 0.25 to 0.35.

(3) The curable silicone rubber composition as set forth in (1) or (2), in which the peak q due to the amorphous observed in the range of the peak location q=8.5 to 8.8 of scattered vector q determined by the synchrotron X-ray diffraction measurement of the curable silicone rubber composition, increases by approximately by 0.1 to 0.5, because of Strain-induced Crystallization caused by extending (4) The curable silicone rubber composition as set forth in any one of (1) to (3), in which the curable silicone rubber composition has tear strength of 40 N/m or more, as determined by the method according to JIS K 6252 vulcanized rubber and thermoplastic rubber.

(5) A method for measuring the curable silicone rubber composition as set forth in (2), in which the extending is performed by using a high-speed tensile test apparatus at an extending rate ranging from 1 to 20 mm/sec until cutting occurs and simultaneously the synchrotron X-ray diffraction measurement is performed.

Effect of the Invention

The silicone rubber obtained by curing the curable silicone rubber composition according to the present invention excels in tear strength. Accordingly, the compact made of the curable silicone rubber composition according to the present invention and the medical tube constituted from the compact, which excel in mechanical strength such as tear strength. In other words, according to the present invention, it is possible to provide a medical catheter made of silicone rubber, having excellent scar-resistance.

BEST MODE FOR CARRYING OUT THE INVENTION

The curable silicone rubber composition of the present invention is characterized by containing straight chain organopolysiloxane containing vinyl groups, straight chain organohydrogenpolysiloxane, and silica filler of which surface is treated by a silane coupling agent having trimethylsilyl groups.

It has been often performed to add silica filler into curable silicone rubber composition, in order to improve mechanical strength of silicone rubber, in particular, tensile strength. It can be expected to improve tear strength significantly, by adding a silica filler with a surface treated by a specific silica coupling agent thereinto.

The reason why tear strength is improved can be thought as follows: That is, as a result of improvement of dispersibility of silica filler, the interface between silica filler and rubber matrix increases to increase the rubber molecular chain which is affected from a silica filler. Thereby reinforcing effect by silica filler increases to improve mechanical strength. As for the rubber molecular chain which is affected by silica filler, molecular mobility decreases due to the interaction with silica filler, and as a result, it will be harder than the portion having high molecular mobility. In the behavior of tearing of silicone rubber, if tearing stress is added to a hard structure during initial clacks grow and spread, then it serves as a resistance, and as a result, the tear strength increases.

Since it is thought that the dispersibility of silica filler affects remarkably on the mechanical strength as above, at this time small angle X-ray scattering is performed to analyze average aggregation size of silica filler in order to investigate the correlation between the dispersibility of silica filler and the mechanical strength, and as a result, it is confirmed that if the dispersibility of the silica filler is improved, then the mechanical strength, in particular the tear strength increases significantly.

As for the curable silicone rubber composition of the present invention, silicone rubber can be obtained by, for example, after heating the composition at a temperature ranging from 140 to 180° C. for a time period ranging from 5 to 15 minutes (primary curing), subjecting the resultant composition to a post-baking (secondary curing) at 200° C. for 4 hours.

The curable silicone rubber composition is pressed under a condition of a temperature of 170° C., 10 MPa, for 10 minutes into a sheet of 1 mm in thick, the resultant sheet is subjected to a primary curing, subsequently the resultant sheet is heated at a temperature of 200° C. for 4 hours to perform secondary curing, and the resultant silicone rubber sheet is shaped into crescent type test pieces according to JIS K6252 (2001), therewith the tear strength of the crescent type test pieces according to JIS K6252 (2001) is measured.

The aforementioned silicone rubber sheet is punched with a ring cutter having a center peripheral length of 50 mm and a width of 1 mm, into a silicone rubber ring.

Using a high-speed tensile test apparatus, the aforementioned silicone rubber ring is drawn at an extending rate ranging from 1 to 20 mm/sec until the test piece ring is cut, and simultaneously synchrotron X-ray diffraction measurement is performed thereon.

The synchrotron X-ray diffraction measurement referring to here involves both small angle X-ray scattering and wide angle X-ray scattering.

At first, small-angle X-ray scattering (small angle X-ray scattering) is a method for obtaining constitutional information of a substance, by irradiating X-ray to a substance and measuring X-ray scattered from the substance at a small angle of scattering, which can evaluate size, shape, regularity, and dispersibility of the internal constitution. The smaller the scattering angle of X-ray derived from a portion becomes, the larger the size of the structure of the corresponding portion indicates.

Wide-angle X-ray scattering (wide angle X-ray scattering) is a method for obtaining constitutional information of a substance, by irradiating X-rays to a substance and measuring X-rays scattered from the substance at a large angle of scattering, from which constitutional information smaller than that of small angle X-ray scattering is obtainable. This is used for analyzing crystalline structure, in addition, information as to orientation of the test sample is also obtainable.

Moreover, not only performing Small-Angle X-ray Scattering prior to extending in order to investigate in detail the correlation between aggregating and dispersing state and mechanical strength of silica filler, but Small-Angle X-ray Scattering can also be performed simultaneously with extending.

In addition, in order to not only investigate aggregating and dispersing state of silica filler, but also particularly to clarify how each of (A) vinyl groups containing straight chain organopolysiloxane and (B) straight chain organohydrogenpolysiloxane shapes upon being drawn, Wide-angle X-ray scattering can be performed simultaneously with extending Each of Small-angle X-ray scattering measurement and Wide-angle X-ray scattering measurement can be performed by even a commercially available general-purpose X-ray apparatus. For example, it can be performed using a nano scale X-ray constitution evaluating apparatus, NANO-Viewer, which is produced by RIGAKU Co., Ltd.

In addition, it is necessary to perform a measurement in a very short time in order to perform both the measurement and a high-speed extending simultaneously. To do so, it is possible to conduct constitutional analysis of the curable silicone rubber composition, by performing each of Small-angle X-ray scattering measurement and Wide-angle X-ray scattering measurement by synchrotron radiation X-ray, in a large-scale synchrotron radiation facility SPring-8 (spring eight).

SPring-8 is a large-scale synchrotron radiation facility present in Harima science Park city, Hyogo prefecture, Japan, which can generate synchrotron radiation with the highest performance in the World. Synchrotron radiation is a narrow and strong electromagnetic wave, which is generated by accelerating an electron at a rate approximately equivalent to light, and when bending the travelling direction by magnet.

In each of Small-angle X-ray scattering measurement and Wide-angle X-ray scattering measurement, the higher the intension of X-ray becomes, the shorter the period of time for measurement can be. Since the synchrotron radiation X-ray which is available in Spring-8 has brightness of X-ray of 100,000,000 times of those of X-ray of a commercially available general-purpose X-ray apparatus, sufficient intension is obtainable even in a very short period of time of measurement, thereby it is possible to perform a constitutional analysis in extending process.

Measurement condition for a synchrotron radiation X-ray scattering is shown below.

The measurement condition for Small-angle X-ray scattering is a wave length of 1.50 Å, the camera length is 6 m, and as the detector, II+CCD (Image Intensifier+Charge Coupled Device) is used.

The measurement condition for Wide-angle X-ray scattering is a wave length of 0.832 Å, the camera length is 200 mm, and as the detector, II+CCD (Image Intensifier+Charge Coupled Device) is used.

As intension correction of X-ray scattering measurement data, Dark correction (removing noise generated by dark current), Background Correction (removing scattering caused by the matter other than measurement sample such as air), and Transmittance Correction (considering the difference in transmittance between samples) are performed.

The aggregation size of silica filler in the curable silicone rubber composition was analyzed using particle size/diameter of pores analysis software NANO-Solver produced by RIGAKU Co., Ltd.

It is preferred that aggregation size of silica filler in the curable silicone rubber compositions by the aforementioned analyzing method is 30 nm or less. More preferably the aggregation size is 25 nm or less, and most preferably 20 nm or less. The aggregation size of more than 30 nm of silica filler does not provide preferable dispersibility, and improvement of mechanical strength is not expectable.

Moreover, since the particle size of a silica filler ranges approximately from 7 to 14 nm, the aggregation size of silica filler cannot be equal to or less than the range of 7 to 14 nm, which is the particle size.

Degree of orientation is evaluated using orientation coefficient.

The orientation coefficient can be calculated from a result of a two-dimensional Wide-angle X-ray scattering measurement.

The orientation coefficient is calculated from the following mathematical formula 1.

$$\langle \cos^2\phi_{hkl}\rangle = \frac{\int_0^\pi I(\phi)\sin\phi\cos^2\phi\, d\phi}{\int_0^\pi I(\phi)\sin\phi\, d\phi}$$ [Formula 1]

$$f_{hkl,z} = \frac{1}{2}(3\langle\cos^2\phi_{hkl}\rangle - 1)$$

$$f_{b,z} = -2f_{hkl,z}$$

Here, f denotes an orientation coefficient, I denotes a scattering intensity, Φ denotes an angle of circumferential direction, subscripts "hkl" denote Mirror index of the crystal plane, respectively.

As for the orientation coefficient, 1 indicates that it is oriented perfectly in the extending direction; 0 indicates that it is oriented randomly; −0.5 indicates that it is oriented in a direction perpendicular to the drawing direction.

It can be thought that because of improvement of silica filler, the interface between silica filler and rubber matrix increases, such that rubber molecular chain being affected from silica filler increases, thereby the rubber molecular chain is hardly oriented due to the extending.

The maximum value of orientation coefficient of the rubber molecular chain in the curable silicone rubber composition under the extending of the aforementioned analyzing method is preferably 0.45 or less. More preferably, the maximum value of orientation coefficient is 0.35 or less, and most preferably 0.3 or less. When the orientation coefficient is more than 0.45, the dispersibility of the filler becomes poor, it is suggested that a rubber molecular chain without interaction with filler may be oriented.

The aforementioned orientation represents that due to the extending the rubber molecular chain in the curable silicone rubber composition forms a liquid crystal phase, or an intermediate phase (meso phase) or an optically anisotropic phase, or that due to the extending the molecular chain forming an amorphous phase of silicone rubber is oriented in the direction of the extending.

Strain-induced Crystallization represents that as a result of progression of the aforementioned orientation, molecular chain causes phase transition from amorphous phase to crystalline phase, or liquid crystalline phase, intermediate phase (meso phase) or optically anisotropic phase.

The aforementioned Strain-induced Crystallization can be confirmed by observing that the peak location of amorphous of silicone rubber shifts to high-q side due to extending. Specifically, q increases by 0.1 to 0.5.

Since the elastic modulus of silicone rubber in the extending process is improved due to Strain-induced Crystallization, the strength is expected to improve.

As mentioned above, the silicone rubber obtained by curing the curable silicone rubber composition of the present invention exhibits excellent tensile strength and tear strength. Therefore, by using the curable silicone rubber composition of the present invention, it is possible to obtain a catheter made of silicone rubber which has excellent scar-resistance and kink-resistance.

EXAMPLE

One aspect of curable silicone rubber composition of the present invention will be explained by the embodiments, but the present invention is not limited thereto.

Raw material used in Examples and Comparative Examples are as follows:

(A): Vinyl group-containing straight chain organopolysiloxane, vinyl group content 0.13 mol %, which was synthesized by the following synthesis scheme.

(B): Straight chain organohydrogenpolysiloxane, produced by MOMENTIVE "TC25D" (C1): Silica filler of which a surface was treated with hexamethyldisilazane, "AEROSIL RX300" produced by NIHON AEROSIL, and which has a specific surface of 300 m²/g, a primary average particle diameter of 7 nm, and a carbon content 3.5 weight %

(C2): Silica filler of which surface was treated with dimethyldichlorosilane, "AEROSIL R974" produced by NIHON AEROSIL, and which has a specific surface of 200 m²/g, and a primary average particle diameter of 12 nm (D) Platinum: "TC-25A" produced by MOMENTIVE

[Synthesis of Vinyl Group Containing Straight Chain Organopolysiloxane (A)]

The first vinyl group containing straight chain organopolyoxosilane (A) was synthesized, in accordance with the following chemical formula (1).

Specifically, into a 300 mL separable flask being substituted by Ar gas, equipped with a condenser tube and a stirring wing, Octamethylcyclotetrasiloxane in an amount of 74.7 g (252 mmol), 2,4,6,8-tetramethyl 2,4,6,8-tetravinylcyclotetrasiloxane in an amount of 0.086 g (0.25 mmol) and potassium siliconate in an amount of 0.1 g were put, and then, it was heated and agitated at 120° C. for 30 minutes. Increasing of the viscosity could be confirmed.

Thereafter, it was heated to be 155° C., and stirring was continued for 3 hours. 3 hours later, 1,3-divinyltetramethyldisiloxane in an amount of 0.1 g (0.6 m mol) was added, it was further stirred at 155° C. for 4 hours.

4 hours later, after the reaction mixture was diluted with 250 ml of toluene, the resultant mixture was washed with water three times. The organic layer after washing was washed with 1.5 L of methanol to be reprecipitated and purified, thereafter the oligomer and polymer were separated therefrom. The resultant polymer was depressurized at 60° C. overnight to be dried, and thereby the second vinyl group containing straight chain organopolyoxosilane was obtained (Mn=277,734, Mw=573,906, IV value (dl/g)=0.89).

[chemical fomula 1]

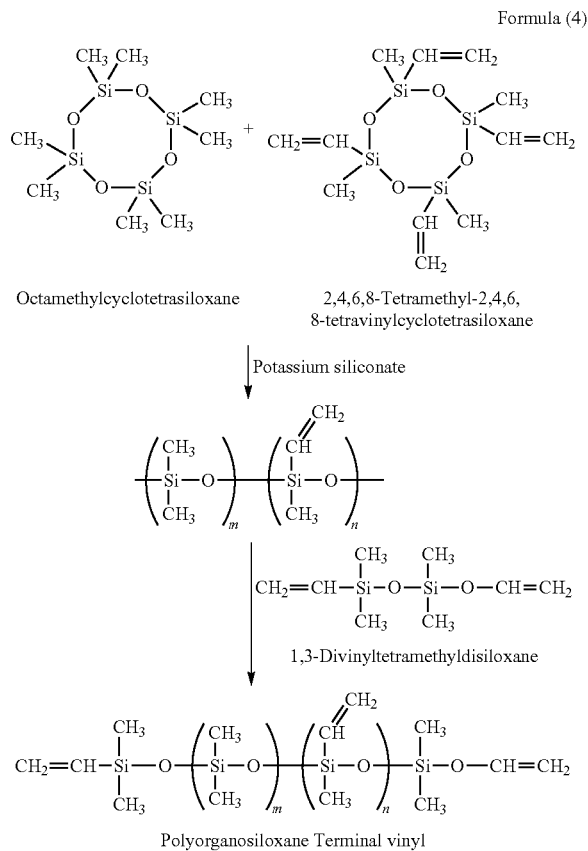

Formula (4)

Octamethylcyclotetrasiloxane    2,4,6,8-Tetramethyl-2,4,6,8-tetravinylcyclotetrasiloxane Potassium siliconate 1,3-Divinyltetramethyldisiloxane Polyorganosiloxane Terminal vinyl Example 1

Preparation of Curable Silicone Rubber Composition

Into 100 parts by weight of (A1) the first vinyl group containing straight chain organopolysiloxane, 70 weight parts of (C1) silica filler was added, then the resultant mixture was kneaded to prepare a masterbatch.

Subsequently, 0.5 weight parts of (D) platinum was added thereto and kneaded until the mixture became homogeneous, thereafter 2.0 wait parts of (B) straight chain organohydrogenpolysiloxane was added thereto and kneaded to prepare a curable silicone rubber composition.

Weight ratio of each of raw materials is shown in Table 1.

(Evaluation of Curable Silicone Rubber Composition)

<Tear Strength and Tear Stroke>

The resultant curable silicone rubber composition was pressed at 170° C., under 10 MPa for 10 minutes, thereby shaping it into a sheet 1 mm thick and performing the primary curing.

Subsequently, the resultant sheet was heated at 200° C. to perform the secondary curing.

Using the resultant silicone rubber sheet, crescent type test-pieces were prepared in accordance with JISK6252 (2001), and tear strength of crescent type test-piece in accordance with JISK6252 (2001) and elongation (stroke) until the test-piece was cut were measured. Provided that the thickness of the test-piece was 1 mm. The results are shown in Table 1.

<Tensile Strength and Tensile Extensibility>

The resultant curable silicone rubber composition was pressed at 170° C., under 10 MPa for 10 minutes, thereby shaping it into a sheet 1 mm thick and performing the primary curing.

Subsequently, the resultant sheet was heated at 200° C. to perform the secondary curing.

Using the resultant silicone rubber sheet, dumbbell-shaped No. 3 type test-pieces were prepared in accordance with JISK6251 (2004), and the tensile strength of dumbbell-shaped No. 3 type test-piece in accordance with JISK6251 (2004) and the elongation at cutting-off (strain) were measured. Provided that the thickness of the test-piece was 1 mm. The results are shown in Table 1.

<Filler Aggregation Size>

The resultant silicone rubber sheet was punched with a ring cutter having a center peripheral length of 50 mm and a width of 1 mm, into a silicone rubber ring. Using a high-speed tensile test apparatus, the resultant silicone rubber ring was drawn at an extending rate of 1 mm/sec and was subjected to Small-angle X-ray scattering measurement through Spring-8.

The measurement condition for Small-angle X-ray scattering was wave length of 1.50 Å, the camera length was 6 m, and as the detector, II+CCD (Image Intensifier+Charge Coupled Device) was used.

The irradiation time of X-ray in one measurement was 50 milliseconds, and the measurement was performed at an interval of one time every 3 seconds.

In order to determine scattering intension of test-sample exactly, as intension correction of X-ray scattering measurement data, Dark correction (removing noise generated by dark current), Background Correction (removing scattering caused by the matter other than measurement sample such as air), and Transmittance Correction (considering the difference in transmittance between samples) were performed.

From X-ray scattering measurement data after the aforementioned correction was effected thereon, the aggregation size of silica filler in the curable silicone rubber composition was analyzed using the particle size/diameter of pores analysis software NANO-Solver produced by RIGAKU Co., Ltd. The results are shown in Table 1.

<The Maximum Orientation Coefficient>

Using a high-speed tensile test apparatus, the resultant silicone rubber ring was drawn at a drawing rate of 1 mm/sec and was subjected to Small-angle X-ray scattering measurement through Spring-8.

The measurement condition for Wide-angle X-ray scattering was wave length of 0.832 Å, the camera length was 200 mm, and as the detector, II+CCD (Image Intensifier+Charge Coupled Device) was used.

The irradiation time of X-ray in one measurement was 70 milliseconds, and the measurement was performed at an interval of one time every 3 seconds.

Similar to Small-angle X-ray scattering measurement, the result of the Wide-angle X-ray scattering measurement was subjected to the intension correction, thereafter, the orientation coefficient was calculated using the following mathematical formula. The orientation coefficient became the maximum value just before the extending, this value will be called the maximum orientation coefficient. The result of the maximum orientation coefficient is shown in Table 1.

$$\langle \cos^2 \phi_{hkl} \rangle = \frac{\int_0^\pi I(\phi) \sin\phi \cos^2\phi \, d\phi}{\int_0^\pi I(\phi) \sin\phi \, d\phi} \quad \text{[Formula 2]}$$

$$f_{hkl,z} = \frac{1}{2}(3\langle \cos^2 \phi_{hkl} \rangle - 1)$$

$$f_{b,z} = -2 f_{hkl,z}$$

Here, f denotes an orientation coefficient, I denotes a scattering intensity, Φ denotes an angle of circumferential direction, subscripts "hkl" denote a mirror index of a crystal plane.

TABLE 1

| | | Example | Comparative Example |
|---|---|---|---|
| (A) | | 100 | 100 |
| (B) | | 2 | 2 |
| (C1) | 300 m²/g (*1) 7 nm (*2) | 70 | — |
| (C2) | 200 m²/g (*1) 12 nm (*2) | — | 70 |
| (D) | | 0.5 | 0.5 |
| JIS K6252 | Tear Strength (N/mm) | 48 | 12.4 |
| | Stroke (mm) | 194.5 | 6.4 |
| JIS K6251 | Tensile Strength (MPa) | 102 | 8.4 |
| | Elongation when cutting-off (m) | 1450.3 | 474.9 |
| Small-angle X-ray scattering measurement | Filler Aggregation Size (nm) (*3) | 21.8 | 30.6 |
| Wide-angle X-ray scattering measurement | Maximum Orientation Coefficient (—) | 0.29 | 0.47 |
| | Scattering Vector Peak Location before extending (nm⁻¹) | 8.71 | 9.02 |
| | Scattering Vector Peak Location just before cutting-off (nm⁻¹) | 8.71 | 8.72 |

(*1): Specific surface of silica filler
(*2): Primary average particle diameter of silica filler
(*3): Filler aggregation size before extending <Peak Shift by Strain-Induced Crystallization>

In addition, based on the aforementioned Wide-angle X-ray scattering measurement, by plotting peak locations of the scattering vector q in each step in the extending process, correlation between extending magnification and peak locations were clarified. The peak location indicated the maximum value just before cutting-off, the results of which are shown in Table 1.

Comparative Example 1

Curable silicone rubber composition was prepared similar to Example 1, excepting that a (C2) silica filler was used instead of a (C1) silica filler.

In addition, similar to Example 1, evaluation was conducted about the test-piece prepared using the resultant curable silicone rubber composition. The results are shown in Table 1.

[Result]

As shown in Table 1, the silicone rubber obtained by curing the curable silicone rubber composition of Example 1 using a (C1) silica filler which was treated with the trimethylsilyl group containing silane coupling agent exhibited tear strength of 28 N/mm or more, a tensile strength of 7.5 MPa or more, which has both excellent tear strength and excellent tensile strength.

In particular, the tear strength of the silicone rubber of Example 1 was significantly improved, compared to the silicone rubber of Comparative Example 1 using (C2) silica filler which was not treated with the trimethylsilyl group containing a silane coupling agent.

In addition, with respect to stroke and elongation at cutting-off, the silicone rubber of Example 1 exhibited significant improvement compared to the silicone rubber of Comparative Example 1, it revealed that high elongation is obtained even if a large amount of silica is filled.

From the result of X-ray scattering analysis, it is revealed that the silicone rubber obtained by curing the curable silicone rubber composition of Example 1 has a filler aggregation size which is smaller than that of the silicone rubber of Comparative Example 1, and as a result, the rubber molecular chain in Example 1 is hardly oriented even when extending. It can be thought that this is because the silicone rubber of Comparative Example 1 is superior to the silicone rubber of Example 1 in terms of dispersibility of filler. It is thought that improvement of the dispersibility shows increase of interface between silica filler and rubber matrix, and as a result, the promote effect by silica filler increased. It is revealed that in the silicone rubber of Examples, the degree of orientation of rubber molecular chain is small even when extending, whereas in the silicone rubber of Comparative Example, Strain-induced Crystallization which is not observed develops. Based on this result, it can be thought that the strength of the silicone rubber itself has been improved.

INDUSTRIAL APPLICABILITY

The silicone rubber obtained by curing the curable silicone rubber composition of the present invention excels in tear strength. Accordingly, each of the compact made of the curable silicone rubber composition of the present invention and the medical tube constituted from the compact excels in mechanical strength such as tear strength. In other words, in accordance with the present invention, it is possible to provide a medical catheter made of silicone rubber having excellent scar-resistance. Therefore, the present invention is very useful in industry.

The invention claimed is:

1. A cured silicone rubber composition comprising silica filler characterized in that the aggregate size of the silica filler prior to extending as determined by synchrotron X-ray diffraction measurement ranges from 20 to 25 nm.

2. The cured silicone rubber composition as set forth in claim 1, wherein the maximum value for the orientation coefficient of the cured silicone rubber composition as determined by the synchrotron X-ray diffraction measurement ranges from 0.25 to 0.35 while extending the cured silicone rubber composition at an extending rate ranging from 1 to 20 mm/sec.

3. A method for measuring the cured silicone rubber composition as set forth in claim 2, wherein the extending is performed by using a high-speed tensile test apparatus at an extending rate ranging from 1 to 20 mm/sec until cutting occurs and simultaneously the synchrotron X-ray diffraction measurement is performed.

4. The cured silicone rubber composition as set forth in claim 2, wherein the peak q due to the amorphous state observed in the range of the peak location q=8.5 to 8.8 of scattered vector q determined by the synchrotron X-ray diffraction measurement of the cured silicone rubber composition, increases by approximately 0.1 to 0.5, because of Strain-induced Crystallization caused by extending.

5. The cured silicone rubber composition as set forth in claim 2, wherein the cured silicone rubber composition has tear strength of 40 N/m or more, as determined by the method according to JIS K 6252.

6. The cured silicone rubber composition as set forth in claim 1, wherein the peak q due to the amorphous state observed in the range of the peak location q=8.5 to 8.8 of scattered vector q determined by the synchrotron X-ray diffraction measurement of the curable silicone rubber composition, increases by approximately 0.1 to 0.5, because of Strain-induced Crystallization caused by extending.

7. The cured silicone rubber composition as set forth in claim 6, wherein the cured silicone rubber composition has tear strength of 40 N/m or more, as determined by the method according to JIS K 6252.

8. The cured silicone rubber composition as set forth in claim 1, wherein the cured silicone rubber composition has tear strength of 40 N/m or more, as determined by the method according to JIS K 6252.

9. A process for producing silicone rubber cured product characterized in that the aggregate size of silica filler prior to extending as determined by synchrotron X-ray diffraction measurement ranges from 20 to 25 nm, comprising:

kneading a vinyl group containing straight chain organopolysiloxane, silica filler of which surface is treated by a silane coupling agent having trimethylsilyl groups, and platinum catalyst to form silicone rubber curable composition, heating the silicone rubber curable composition at a temperature ranging from 140 to 180° C. for a period of time ranging from 5 to 15 minutes to perform a primary curing, and heating the primary cured silicone rubber curable composition at a temperature of approximately 200° C. for a period of time approximately 4 hours to perform a secondary curing.

10. The process for producing silicone rubber cured product as set forth in claim 9, wherein the vinyl groups containing linear organopolysiloxane is a polyorganosiloxane terminal vinyl represented by the following formula:

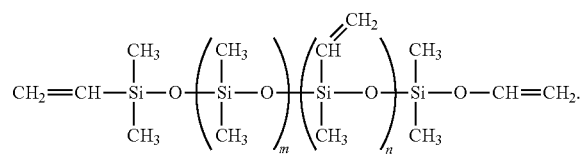

11. The process for producing silicone rubber cured product as set forth in claim 10, wherein the silane coupling agent having trimethylsilyl group is hexamethyldisilazane or dimethyldichlorosilane.

12. The process for producing silicone rubber cured product as set forth claim 11, wherein the silica filler is a silica beads.

13. The process for producing silicone rubber cured product as set forth in claim 10, wherein the silica filler is a silica beads.

14. The process for producing silicone rubber cured product as set forth in claim 9, wherein the silane coupling agent having trimethylsilyl group is hexamethyldisilazane or dimethyldichlorosilane.

15. The process for producing silicone rubber cured product as set forth claim 14, wherein the silica filler is a silica beads.

16. The process for producing silicone rubber cured product as set forth in claim 9, wherein the silica filler is a silica beads.

* * * * *